Aug. 25, 1959　　　E. H. REHNBORG ET AL　　　2,901,718
PRESSURE TRANSDUCER
Filed Sept. 14, 1956

INVENTORS
EDWARD H. REHNBORG
JACK L. SAYRE
BY
Christie, Parker & Hale
ATTORNEYS

United States Patent Office 2,901,718
Patented Aug. 25, 1959

2,901,718

PRESSURE TRANSDUCER

Edward H. Rehnborg, San Gabriel, and Jack L. Sayre, Duarte, Calif., assignors to Edcliff Instruments, Inc., Duarte, Calif., a corporation of California Application September 14, 1956, Serial No. 609,941

1 Claim. (Cl. 338—41)

This invention relates to a pressure transducer characterized by compactness and durability.

Many pressure measuring or sensing devices have heretofore included a pressure sensing element in the form of a bellows or Bourdon tube upon the exterior of which a conventional switch or potentiometer contact is mounted. In the potentiometric units this contact is engaged with a suitable resistor mounted adjacent the pressure sensing element and wipes the resistor responsive to deflection of the pressure sensitive bellows or Bourdon tube occasioned by establishment of a pressure differential between the interior and exterior of the element.

Present transducers which embody a bellows as the pressure sensitive element suffer from undue size resulting in part from the practice of packaging a separate pressure sensing means and electrically energized transducing means in a single housing. Also in the conventional instrument, the electrical components of the unit are exposed to the atmosphere surrounding the pressure sensitive element.

We have now devised a transducer embodying a pressure sensitive bellows in which the size of the unit is determined solely by the size of the bellows element employed and in which the electrical components of the transducer do not add to the size of the unit and may be sealed from exposure to the atmosphere under test. To this end the invention is in a transducer comprising a housing, a bellows mounted within the housing for expansion and contraction responsive to pressure changes within the housing, electrically energized sensing means disposed within the bellows for actuation responsive to elongation and contraction of the bellows, and electrical leads extending from the sensing means exteriorly of the housing to enable detection of such belows deflection. In accordance with the invention, any type of electrically energized sensing means, such as a potentiometer, simple switch, differential transformer, strain wire system, or the like, can be embodied in the improved transducer. The invention is suited, for example, to pressure transducers having potentiometric output and in this preferred application may comprise a base, a bellows mounted to the base so that the base closes one end thereof, a closure plate at the opposite end of the bellows, a resistor mounted to the base within the confines of the bellows, a pair of electrical terminals extending through the base and connected to opposite ends of the resistor, a contact depending from the closure plate in engagement with the resistor and movable along the resistor responsive to displacement of the closure plate, a third electrical terminal extending through the base and connected through a frictionless spring to the contactor, a housing mounted to the base and enclosing a bellows, and a port opening into the housing exteriorly of the bellows.

A unique feature of the transducer of the invention is the enclosure of the electrical components thereof within the pressure sensing bellows. As mentioned above, this enables restriction of the size of the transducer to a unit compatible with enclosure of the bellows only, the electrical components in no way adding to its size.

In one embodiment of the invention an exhaust tube is provided through the base so that upon assembly the bellows may be evacuated, in which event the unit operates as an absolute pressure sensitive transducer or switch. Also, this embodiment has the advantage that the electrically energized sensing means are hermetically sealed to protect them from moisture and dust.

Alternatively, a second port may be provided through the base giving access to the interior of the bellows, whereby the instrument is sensitive to differential pressures. In either event, the fluid introduced to the unit through the port in the housing exterior of the bellows does not contact the electrical elements which in this fashion may be protected from corrosion attendant upon exposure to certain fluids and gases.

Although as described above many forms of electrical means responsive to bellows deflection may be employed, a potentiometer is preferably adapted to this use because of the relatively long stroke available, and the invention is described in greater detail in this embodiment in conjunction with the accompanying drawings, in which.

Figure 1:
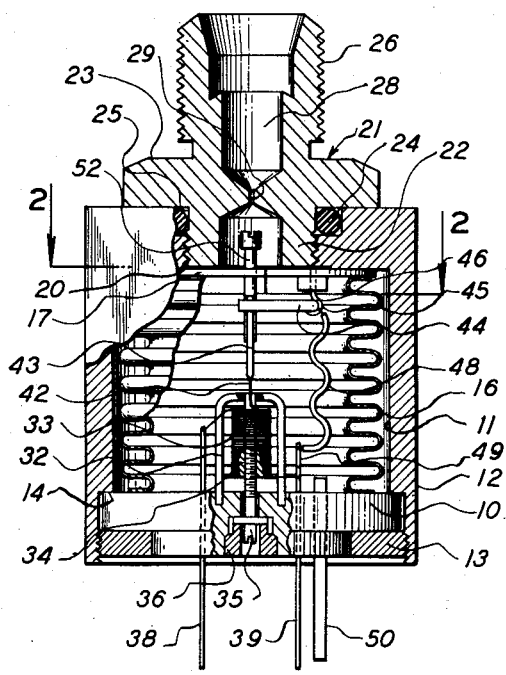
Fig. 1 is an elevation, partly in section, of one embodiment of the invention.
Figure 2:
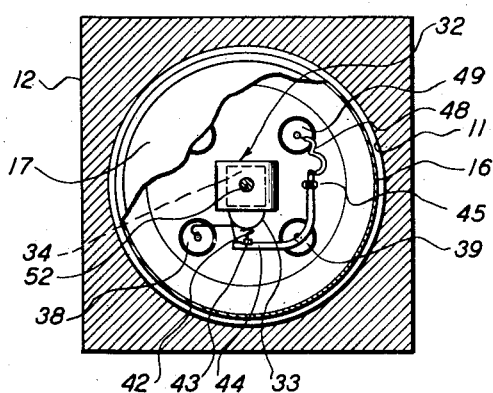
Fig. 2 is a plan view taken on the line 2—2 of Fig. 1.

The transducer shown in Figs. 1 and 2 comprises a base 10 affixed to close a cylindrical cavity 11 in a case 12. A clamping ring 13 is screwed into the case 12 to clamp the base 10 against an internal shoulder 14 formed adjacent the outer end of cavity 11.

A flexible metallic bellows 16 is sealed at one end to the base 10, the base forming a closure therefor. A closure plate 17 is affixed to and encloses the opposite end of the bellows. The cavity 11 in the case is of a diameter just larger than the maximum O.D. of the bellows. The tolerance in these dimensions is preferably such that the bellows does not bear against the case wall, but at the same time the case provides a stop against a build-up of vibration amplitude or excessive tilt of the bellows due to non-uniformity of material or wall thickness resulting in a localized stiffness distribution.

The case 12 is drilled and tapped at 20 to receive a bushing 21, the bushing having a threaded stem 22 to thread into the case and an annular flange 23 to bear against an outer face of the case and to seal against an O ring 24 housed in an annular channel 25 in the case. The bushing 21 includes a threaded nipple 26 for connection to the pressure source to be measured. The bushing has a stepped bore 28 in which a porous plug or filter may be housed for removing solids and for damping pressure shocks or surges. The bushing may also include a small diameter flow limiting section 29 through which the interior of the case 12 is connected to a source of pressure to be measured. The terminology "source of pressure" has reference to absolute pressure in connection with the embodiment of Fig. 1 and hence may represent either sub-atmospheric or super-atmospheric pressure.

A U-shaped frame 32 is mounted to the base 10 interiorly of the bellows 16 and a wire coil resistor 33 is mounted within the confines of the U frame by means of a coil holder 34. The coil holder is threaded on a shaft 35 journaled at one end in the upper cross-member of frame 32 and at its opposite end through the base. The shaft is held in a longitudinally fixed position by a retaining ring 36 affixed to the base in a manner to permit rotation of the shaft. The resistor holder 34 is rectangular in plan (see Fig. 2) and is thereby prevented from rotation within the U frame 32. The shaft 35 therefore doubles as a support member and as a phase adjusting screw for achieving and maintaining proper phasing of the resistor. Upon final assembly and phasing, the shaft 35 is potted, soldered or otherwise sealed in the finally adjusted position to prevent subsequent mal-adjustment. Leads 38, 39 are sealed through the base and connected respectively to opposite ends of the coil for external connection to a voltage source (not shown).

A wiper 42 is supported in engagement with the coil 33 by an arm 43 depending from a lever arm 44 which is eccentrically attached at 45 to a support 46 depending from the bellows closure plate 17.

Electrical continuity is provided by a frictionless spring lead 48 extending from the lever arm 44 to a third lead 49 sealed through the base 12.

A conduit 50 is provided in the preferred embodiment to permit evacuation of the bellows 16 after assembly, the conduit thereafter being sealed exteriorly of the housing. With the bellows evacuated the transducer measures absolute pressure applied through the flow restricting orifice 29 and the electrical components are hermetically sealed against damage by dust or corrosive atmospheres.

The case itself provides a limit stop on the expansion of the bellows 16, the illustration showing the closure plate 17 approximately abutting the inner end of chamber 11 with the wiper 42 simultaneously at the corresponding extremity of its travel. A pin 52 is threaded through the plate 17 extending interiorly of the bellows for engagement with the top of frame 32 to act as an overpressure stop. Upon assembly of the unit the pin is properly set as a function of the design pressure range and is thereafter soldered or otherwise affixed in relation to the closure plate. This procedure insures against subsequent movement and also hermetically seals the bellows at the point of entry of the pin.

In operation of the transducer as described, the nipple 26 is suitably threaded into a vessel or conduit, the internal pressure of which is to be measured. The bellows is immediately responsive to the pressure changes in the case and assumes an equilibrium position of contraction or expansion. The resultant migrations of the wiper 42 are determined electrically by conventional potentiometric techniques giving a continuous accurate measure of deflections of the bellows which in turn are readily calibrated into pressure measurements. The electrical circuitry of a potentiometer involving a coil and a sliding contact are so well known as to obviate the necessity of illustration and description.

It is apparent that the potentiometer elements within the bellows may be replaced by a differential transformer in which relative motion of core and coil are induced responsive to contraction or expansion of the bellows, by a switch to result in a compact, reliable pressure switch or by any motion-sensitive, electrically-energized sensing means.

Figure 3:
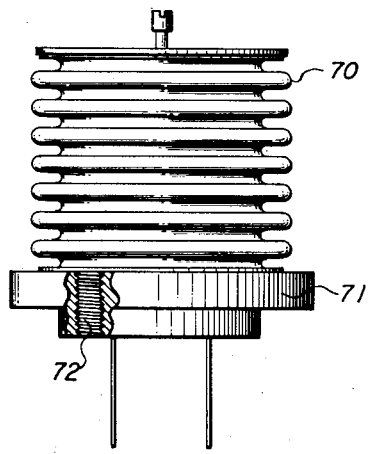
Fig. 3 is an elevation partially in section of the base and bellows portion of an alternate embodiment of the invention.

An alternative embodiment of the invention is illustrated in part in the elevation view of Fig. 3 which shows a bellows pressure sensing element 70 supported on a base 71 for insertion in a housing of the type shown in Fig. 1. The Fig. 3 unit differs from that in Fig. 1 in the provision of a port 72 in the base 71 and the omission of the evacuating conduit identified by reference character 50 in the unit of Fig. 1. With the bellows unit of Fig. 3 replacing the bellows unit in the housing of the Fig. 1 device, the transducer becomes available for use in measuring differential pressures. In such application one source of pressure is connected to the exterior of the bellows as through the bushing 21 in Fig. 1 and the second source of pressure is connected interiorly of the bellows through the port 72. As above described, deflection of the bellows responsive to a pressure differential may be sensed potentiometrically by a potentiometer system enclosed within the bellows as illustrated in Fig. 1.

Although it is not essential that the resistor be supported from the base and the wiper from the migrant end of the bellows, it being possible to reverse the two, the illustrated arrangement in this respect is preferred. With the coil supported from the base it remains unaffected by any tilt in the bellows, and contact between the wiper and coil in such eventuality remains very near to the intersection of the centerline of the bellows closure plate and the base. This condition does not exist if the coil is depended from the bellows closure plate end the bellows is in a tilted attitude.

It will be seen that the constant objective of miniaturization of pressure transducers has been significantly advanced by reason of the construction of the invention. The drawing of Fig. 1 graphically illustrates the fact that the transducer need be only scarcely larger than the pressure sensing bellows itself. This is in contrast with conventional potentiometric pressure transducers in which the bellows takes only a fraction of the total transducer volume and is used to move an exteriorly mounted wiper along an externally mounted resistor. In addition to and accompanying the advantage of miniaturization, the invention also enables protection of the sensitive electrical portions thereof from the effects of the fluids, the pressure of which is being measured. Even where the unit is to be used for differential purposes, one may expose the electrical portions of the instrument to the relatively less harmless of the two atmospheres to be compared, or may isolate these by diaphragm means.

The external configuration and construction of the transducer housing including the means for connection to a source of pressure to be measured may be varied within wide limits since the invention deals with the relationship of the pressure responsive means and the electrical sensing means, and is in no way limited to the case structure as illustrated and described.

We claim:

A pressure transducer comprising a base member, a flexible bellows mounted to and closed at one end by the base, a closure plate sealing the other end of the bellows, a frame rigidly affixed to the base within the confines of the bellows, a shaft journaled at one end through the base and at the other end in the frame remote from the base, a resistor element threaded on the shaft between the base and the remote portion of the frame whereby rotation of the shaft results in displacement of the resistor element longitudinally on the shaft, the shaft being adapted to be hermetically and structurally sealed upon final adjustment of the position of the resistor element, a wiper contact depending from the closure plate within the bellows and engaging the resistor element for relative motion responsive to elongation and contraction of the bellows, and electrical leads extending from the resistor element and wiper exteriorly of the housing.

References Cited in the file of this patent

UNITED STATES PATENTS

| | | |
|---|---|---|
| 2,399,129 | Malone | Apr. 23, 1946 |
| 2,423,609 | Middleton et al. | July 8, 1947 |
| 2,484,030 | Hastings et al. | Oct. 11, 1949 |
| 2,507,501 | Clark | May 16, 1950 |
| 2,515,785 | Minter | July 18, 1950 |
| 2,622,177 | Klose | Dec. 16, 1952 |

OTHER REFERENCES

Perrin: "Pressure Gauge Actuating Elements," pages 7–10 inc., Instrumentation, July 1947, vol. 2, No. 6.